(No Model.)

E. WESTON.
ELECTRICAL MEASURING INSTRUMENT.

No. 433,637. Patented Aug. 5, 1890.

WITNESSES:
Gustave Dieterich.
J. W. Jenkinson

INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING INSTRUMENT.

SPECIFICATION forming part of Letters Patent No. 433,637, dated August 5, 1890.

Application filed January 18, 1890. Serial No. 337,379. (No model.)

*To all whom it may concern:*

Be it known that I, EDWARD WESTON, of Newark, Essex county, New Jersey, have invented a new and useful Improvement in Electrical Measuring Instruments, of which the following is a specification.

My invention relates to an electrical measuring instrument intended chiefly for use as an electro-dynamometer for the measurement of alternating currents of electricity.

My invention consists, broadly, in a fixed or stationary coil and a coil oscillating or vibrating on inclosed pivots in the field of force of said stationary coil, said coils being electrically connected. The vibrating coil on the passage of a current through the circuit including both coils assumes an angular position, depending upon the difference of potential between the terminals of the circuit. The reversals of the current in both coils occur simultaneously, and hence an index or pointer connected to the movable coil is always deflected in the same direction, thus indicating the extent of said angular movement upon a suitable scale.

My invention further consists in the construction and arrangement of the instrument, as hereinafter more particularly pointed out.

Figure 1:
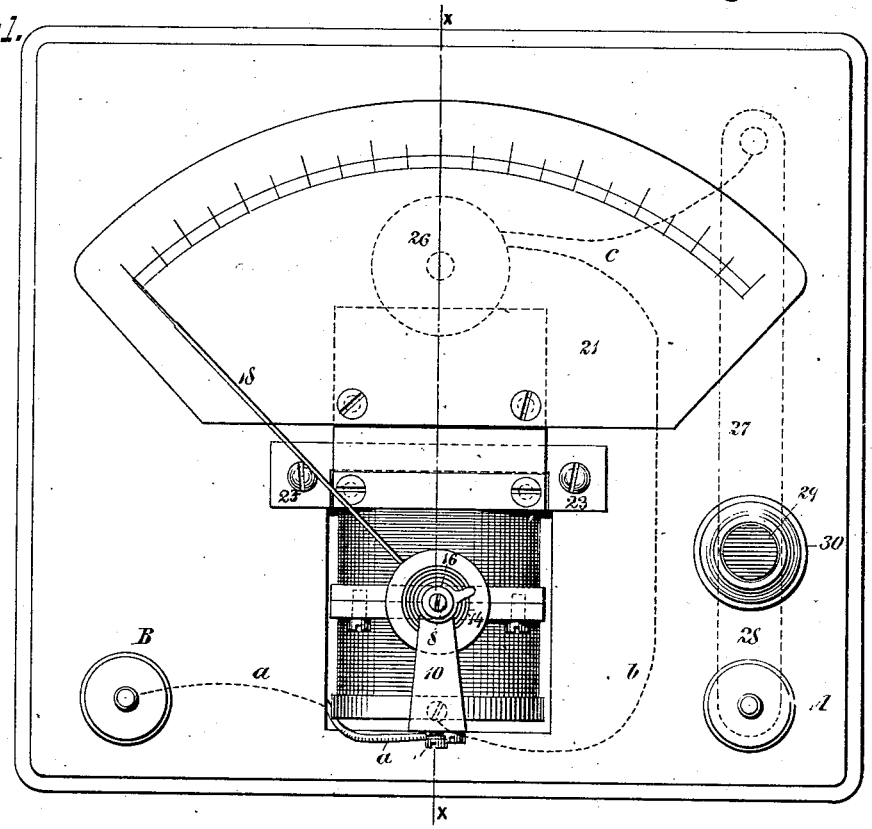
Figure 2:
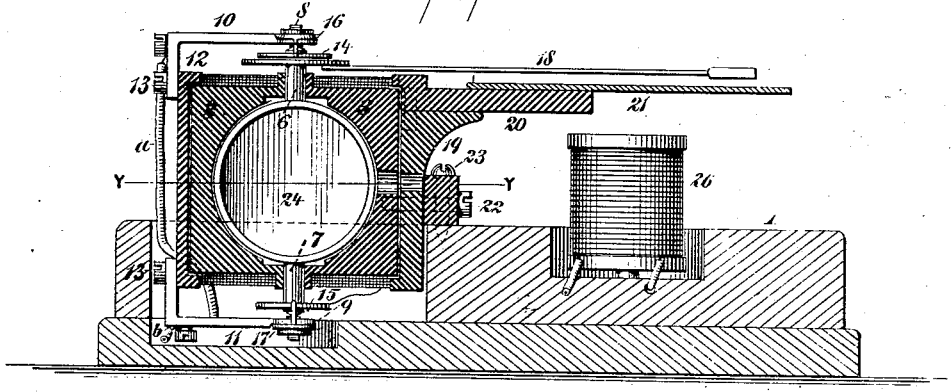
Figure 3:
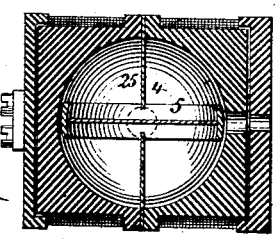

In the accompanying drawings, Figure 1 is a plan view; Fig. 2, a section on the line X X of Fig. 1; and Fig. 3 a section on the line Y Y, Fig. 2.

Similar letters and numbers of reference indicate like parts.

1 is the base of the instrument, suitably recessed to receive the two bobbins or spools 2 and 3, which are placed end to end and surrounded by coils of fine insulated wire connected in series. The bodies of the spools 2 and 3 are made of rubber or other insulating material, and they are hollowed out to form a spherical cavity 4, Fig. 3.

5 is a circular frame of insulating material—such as shellacked paper—on which is wound a coil of fine wire, the terminals of which are connected to the pivot-pins 6 and 7, which pins are secured to said frame. The said pins are therefore journaled in the bodies of the spools 2 and 3, and have their bearings in adjustable steps 8 and 9, which are supported upon the metal arms 10 and 11. The arms 10 and 11 are secured to an outer cover 12, which extends over the outer face of the spool 2 by means of screws 13. Surrounding the pivot-pins 6 and 7 are spiral springs 14 and 15, the inner ends of said springs being connected to said pivot-pins, and the outer ends of said springs being connected to arms 16 and 17, which are pivoted at the extremities of said arms 10 and 11. By turning the arms 16 and 17 on their pivots the springs 14 and 15 may be contracted or expanded. Supported on the upper pivot-pin is a light metallic disk, which carries an indicating-needle 18. The covering-plate 19 on the face of spool 3 carries a horizontal plate 20, to which is secured a scale-plate 21; also to the plate 19 is fastened by screws 22 a cross-piece, and through this cross-piece extend screws 23, which enter the base 1. By removing these screws 23 the spools 2 and 3 and associated parts can be separated from the base.

Within the ring 5 and filling the space included in it is a sheet of mica 24. This sheet passes through an opening in a diaphragm 25, of rubber or other non-conducting material, which is held between the spools 2 and 3 and extends diametrically across the spherical opening or chamber 4.

26 is an ordinary resistance-coil supported in a recess on the base in any suitable manner.

27 and 28 (dotted lines) are two contact-springs, the spring 28 being in electrical contact with the binding-post A.

29 is a push-button passing through a sleeve 30, which surrounds an opening in the base-plate 1, which button when depressed moves the springs 27 and 28 into contact, and so closes the circuit.

The circuit in the instrument proceeds as follows: From the binding-post B by wire *a* to one of the terminals of the coils on the spools 2 and 3 and through said coils, the other terminal of which is connected to the lower spring 15. The current then passes by the pivot 7 to and through the movable coil on the frame 5 and thence to the pivot 6 and upper bracket 10, thence by the wire *b* through the resistance-coil 26 to the contact-plate 27, by wire *c* to contact-plate 28, and so to binding-post A.

It is intended to use this instrument to measure the electro-motive force of alternating currents; or, in other words, as the several coils are all connected in series and as the resistance-coil 26 is made of high resistance, to measure the difference of potential between the binding-posts A and B. Inasmuch as the movable coil suspended within the fixed coil on the spools 2 and 3 is connected in circuit with the latter, it follows that a reversal of the current in one coil will occur simultaneously with the reversal of the current in the other, and hence the needle will always be deflected in the same direction, regardless of the alternations of the current. Of course the normal or zero position of the frame 5 when no current is passing through the instrument is in a plane passing through the longitudinal axis of the coils on the spools 2 and 3, as shown in the drawings, Figs. 2 and 3, and the needle is adjusted so as to mark "zero" on the scale when the movable coil is in this position. The object of the mica diaphragm 24 is to deaden the vibrations of the coil upon the frame 5 through its action as a fan, and this effect is increased by the presence of the diaphragm 25, between which and the movable diaphragm 24 the air becomes somewhat compressed during the movement of the frame, and hence offers still greater resistance to the motion of the latter.

While I here show the spools or bobbins provided with an interior spherical chamber and diaphragm 15 and the frame or ring 5 provided with the diaphragm 24, it is to be understood that said spools or bobbins may be in the form of hollow cylinders and the diaphragms 24 and 25 may be omitted, the said construction not being in anywise essential.

I claim—

1. In an electrical measuring instrument, a stationary coil and a coil oscillating or vibrating on inclosed pivots in the field of force of said stationary coil, said coils being electrically connected.

2. In an electrical measuring instrument, a stationary coil, a coil vibrating or oscillating on inclosed pivots in the field of force of said stationary coil, and a coiled spring connected to a coil-pivot and to an abutment and opposing the motion of said movable coil, said coils being electrically connected.

3. In an electrical measuring instrument, a stationary coil, a coil supported on diametral inclosed pivots and vibrating or oscillating in the field of force of said stationary coil, a coiled spring concentric with the axis of rotation of said vibrating coil, having one end connected to said coil and the other end to an abutment, and means for varying the resiliency of said spring, said coils being electrically connected.

4. In an electrical measuring instrument, a stationary coil, a coil vibrating or oscillating in the field of force of said stationary coil, and a spring of conducting material opposing the movement of said vibrating coil, the said coils and spring being electrically connected.

5. In an electrical measuring instrument, a spool or bobbin having an interior chamber, a coil surrounding said spool, a coil supported within said chamber on diametrally-disposed pivots extending through opposite sides of said spool, supports outside of said spool receiving said pivots, and a coiled spring connected at one end to one of said pivots outside of said spool and at the other end to a fixed abutment, the said coils being electrically connected.

6. In an electrical measuring instrument, the combination of the spool or bobbin of non-inductive material, a coil surrounding said spool, a coil supported within said spool on diametral pivots 6 and 7, arms or brackets 10 and 11 outside of said spool and receiving said pivots, spiral springs 14 and 15, surrounding said pins 6 and 7, and arms 16 and 17, pivoted at the extremities of said arms 10 11, the said springs being connected, respectively, at one end to said pivots 6 and 7 and at the other end to arms 16 and 17, and the said springs and coils being electrically connected in circuit.

7. In an electrical measuring instrument, the combination of a spool or bobbin of non-inductive material, a coil surrounding said spool, a coil supported within said spool on diametral pivots 6 and 7, arms or brackets 10 and 11 outside of said spool and receiving said pivots, spiral springs 14 and 15, surrounding said pins 6 and 7, and arms 16 and 17, pivoted at the extremities of said arms 10 11, the said springs being connected, respectively, at one end to said pivots 6 and 7 and at the other end to arms 16 and 17, and a resistance-coil 14, the said stationary coil, movable coil, springs, and resistance-coil being connected in series.

EDWARD WESTON

Witnesses:
S. O. EDMONDS,
M. BOSCH.